United States Patent
Yamashita et al.

(10) Patent No.: US 7,111,466 B2
(45) Date of Patent: Sep. 26, 2006

(54) MICROREACTOR AND SUBSTANCE PRODUCTION METHOD THEREWITH

(75) Inventors: Hiroyuki Yamashita, Hamamatsu (JP); Masuhiro Okada, Ogasa-gun (JP); Nanayuki Takeuchi, Hamakita (JP)

(73) Assignee: Yamaha Corporation, (JP)

( * ) Notice: Subject to any disclaimer, the term of this patent is extended or adjusted under 35 U.S.C. 154(b) by 236 days.

(21) Appl. No.: 10/922,259

(22) Filed: Aug. 19, 2004

(65) Prior Publication Data

US 2005/0076651 A1   Apr. 14, 2005

(30) Foreign Application Priority Data

Aug. 21, 2003   (JP)   ............... P2003-208306

(51) Int. Cl.
*F25B 21/02*   (2006.01)
(52) U.S. Cl. .......................................... 62/3.7
(58) Field of Classification Search .............. 62/3.2, 62/3.7; 422/104
See application file for complete search history.

(56) References Cited

U.S. PATENT DOCUMENTS

| | | | | |
|---|---|---|---|---|
| 6,043,080 | A * | 3/2000 | Lipshutz et al. | 435/287.2 |
| 6,326,211 | B1 * | 12/2001 | Anderson et al. | 436/177 |
| 6,409,072 | B1 * | 6/2002 | Breuer et al. | 228/111.5 |
| 6,602,473 | B1 * | 8/2003 | Northrup | 422/102 |
| 6,607,655 | B1 * | 8/2003 | Lowe et al. | 205/334 |
| 6,729,352 | B1 * | 5/2004 | O'Connor et al. | 137/827 |
| 6,749,814 | B1 * | 6/2004 | Bergh et al. | 422/130 |
| 6,770,851 | B1 * | 8/2004 | Granneman et al. | 219/390 |
| 6,818,183 | B1 * | 11/2004 | Hajduk et al. | 422/68.1 |
| 6,830,936 | B1 * | 12/2004 | Anderson et al. | 436/180 |
| 6,864,092 | B1 * | 3/2005 | Turner et al. | 436/37 |
| 6,865,081 | B1 * | 3/2005 | Meyer et al. | 361/699 |
| 6,896,855 | B1 * | 5/2005 | Kohler et al. | 422/191 |

FOREIGN PATENT DOCUMENTS

| | | |
|---|---|---|
| EP | 1 174 182 A1 | 1/2002 |
| JP | HEI 10-337173 | 12/1998 |
| JP | 2001-340753 | 12/2001 |
| JP | 2002-79078 A * | 3/2002 |
| JP | 2003-117409 | 4/2003 |
| WO | WO 98/50147 | 11/1998 |
| WO | WO 02/066968 A1 | 8/2002 |

OTHER PUBLICATIONS

Copy of European Search Report dated Nov. 5, 2004.

* cited by examiner

*Primary Examiner*—Mohammad M. Ali
(74) *Attorney, Agent, or Firm*—Dickstein, Shapiro, LLP.

(57) ABSTRACT

A microreactor comprises a reaction chamber, into which prescribed materials are introduced, a production chamber, and a channel for connecting the reaction chamber and the production chamber together. A plurality of temperature adjusting devices (e.g., Peltier elements), each of which can be independently controlled in temperature, are arranged at prescribed positions with prescribed distances therebetween on a substrate in proximity to the reaction chamber, the production chamber, or the channel. Herein, the reaction chamber causes reaction of the materials in response to differences of boiling points, differences of state changes, or difference of solubility, thus producing a new substance, which is transmitted from the reaction chamber to the production chamber via the channel while being adequately controlled in temperature.

11 Claims, 5 Drawing Sheets

MICROREACTOR AND SUBSTANCE PRODUCTION METHOD THEREWITH

BACKGROUND OF THE INVENTION

1. Field of the Invention

This invention relates to microreactors having reaction chambers causing chemical reactions using materials. This invention also relates to substance production methods for producing substances by use of microreactors.

This application claims priority on Japanese Patent Application No. 2003-208306, the content of which is incorporated herein by reference.

2. Description of the Related Art

Conventionally, various types of structures have been developed with respect to microreactors having reaction chambers causing biochemical reactions using materials. The typical type of the conventionally-known microreactor comprises an injection port, an exhaust port, and a channel, in which etching is performed on a silicon substrate so as to process a reaction chamber, wherein the microreactor is sealed in an air-tight manner by using a heat-resisting glass, for example. This microreactor is designed such that cells are divided in response to specific functions therefor so as to perform a plurality of biochemical reactions in parallel. In addition, a temperature adjusting device such as a temperature adjuster is applied to a part of the silicon substrate as necessary. This is disclosed in Japanese Patent Application Publication No. H10-337173 (see pages 3–4, and FIG. 3 in particular).

Another type of the microreactor comprises a plurality of chambers and fine reaction channels, wherein the prescribed liquid is selectively delivered from the chamber(s) by use of a pump (or pumps) and is sent into the fine reaction channels, thus causing reaction with the other liquid given from the other channel(s). In this microreactor, the fine reaction channel provides reaction phases and solvent phases, which are alternatively arranged. That is, the solvent phase is intervened between the two reaction phases, thus allowing a small amount of reaction solution to be extracted in response to different conditions. Herein, a temperature adjusting device can be arranged in the fine reaction channel as necessary. For example, it is possible to provide a Peltier element as a cooling device, which acts as the temperature adjusting device. This is disclosed in Japanese Patent Application Publication No. 2001-340753 (see pages 2–3, and FIG. 1 in particular), for example.

In the conventionally known microreactor as disclosed in Japanese Patent Application Publication No. H10-337173, a temperature control device for a reaction cell is formed as a part of a silicon substrate; that is, it is not designed to produce a temperature gradient in the overall area of the microreactor. In addition, the other microreactor as disclosed in Japanese Patent Application Publication No. 2001-340753 is designed to use a heating device or a cooling device as necessary in order to produce a substance therein, wherein it is very difficult to produce a temperature gradient.

That is, the conventionally known microreactors have difficulties in producing new substances through reactions using materials in response to temperature differences, which are caused to occur upon realization of a temperature gradient (for the sake of temperature control) in channels allowing materials to pass therethrough.

In the above, reactions are performed using temperature differences in the following manners.
(i) It is possible to use differences of boiling points between different materials.
(ii) It is possible to apply state changes on materials by use of temperature differences applied to materials.
(iii) It is possible to use differences of solubility of materials due to temperature differences applied to materials.

SUMMARY OF THE INVENTION

It is an object of the invention to provide a microreactor that allows a substance to be easily produced through reactions using materials in response to temperature differences applied to materials.

It is another object of the invention to provide a substance production method for producing substances by use of the microreactor described above.

In a first aspect of the invention, a microreactor comprises a reaction chamber, into which prescribed materials are introduced, a production chamber, and a channel for connecting the reaction chamber and production chamber together, wherein a plurality of temperature adjusting devices, each of which can independently adjust temperature, are arranged on the substrate in proximity to the chamber and/or the channel.

In the above, a plurality of temperature adjusting devices are arranged at prescribed positions with prescribed distances therebetween in proximity to the chamber and/or the channel. When a substance produced by a reaction of prescribed materials in the reaction chamber is transmitted to the production chamber via the channel under the condition where the temperature adjusting devices are activated such that the production chamber is decreased in temperature compared with the reaction chamber, it is transmitted from the reaction chamber to the production chamber while being gradually cooled down. That is, by adjusting the chambers and channel in temperature by use of the temperature adjusting devices, it is possible to easily actualize adequate temperature controls on materials and substances.

The substrate of the microreactor can be split into a plurality of partitioning substrates, each including the chambers and channel, which are interconnected together, wherein it is possible to freely change the layout of the chambers and channel with respect to each of the partitioning substrates.

The temperature adjusting device can be constituted by a Peltier element, so that it can be handled as a small size cooling device, which can be effectively applied to the microreactor.

The Peltier elements can be embedded in hollows, which are formed in the upper portion or lower portion of the chambers and channel, whereby they are flattened in surfaces and do not project from the surface of the microreactor.

In a second aspect of the invention, there is provided a method for assembling a microreactor, which comprises a reaction chamber, into which prescribed materials are introduced, a production chamber, and a channel for interconnecting the chambers, wherein a plurality of temperature adjusting devices are arranged at prescribed positions with prescribed distances therebetween on a substrate in proximity to the chambers and/or the channel, and wherein the substrate is split into a plurality of partitioning substrates, each having the chambers and channel, which are interconnected together. Thus, it is possible to freely change the layout of the chambers and channel arranged on the substrate by assembling together the partitioning substrates.

In a third aspect of the invention, there is provided a substance production method using a microreactor, which comprises a reaction chamber, into which prescribed materials are introduced, a production chamber, and a channel for connecting the chambers together, wherein a plurality of temperature adjusting devices are arranged at prescribed positions with prescribed distances therebetween on the substrate in proximity to the chambers and/or the channel, so that they are independently set to prescribed temperatures so as to adequately adjust the chambers and channel in temperature, thus actualizing desired reaction of materials.

When a substance produced through a reaction caused on materials in the reaction chamber is transmitted to the production chamber under the conditions in which the production chamber is decreased in temperature compared with the reaction chamber by adequately controlling the temperature adjusting devices, it can be transmitted from the reaction chamber to the production chamber while being gradually cooled down.

That is, by adequately controlling the temperature adjusting devices, it is possible to easily realize temperature controls on materials; therefore, it is possible to produce a new substance produced through reaction on materials, which are subjected to reaction in response to temperature differences, which are controlled by the temperature adjusting devices.

In the above, when a plurality of materials having different boiling points are introduced into the reaction chamber, it is possible to cause reaction on the materials in response to their boiling point differences by independently controlling the temperature adjusting devices.

For example, the temperature adjusting devices are independently activated such that the reaction chamber is increased in temperature and is placed in a gaseous form while the production chamber is decreased in temperature and is placed in a liquid form, whereby the other temperature adjusting devices are activated so as to cool down a new substance while being transmitted from the reaction chamber to the production chamber via the channel.

When a plurality of materials having different state changes are introduced into the reaction chamber, it is possible to cause reaction on the materials in response to differences of state changes by independently controlling the temperature adjusting devices in relation to the reaction chamber and channel respectively.

Furthermore, when materials having different solubility are introduced into the reaction chamber, it is possible to cause reaction on the materials in response to differences of solubility by independently controlling the temperature adjusting devices in relation to the reaction chamber and channel respectively.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

This invention will be described in further detail by way of examples with reference to the accompanying drawings.

Figure 1:
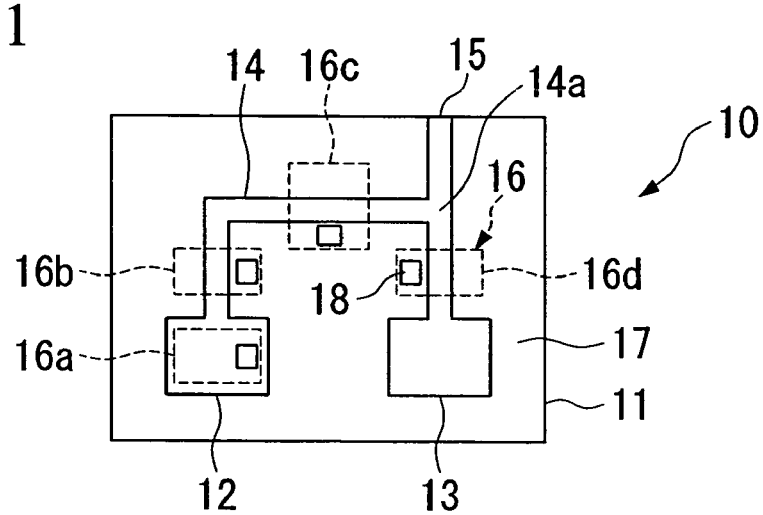
FIG. 1 is a plan view showing a microreactor in accordance with a first embodiment of the invention.

FIG. 1 is an upper view showing a microreactor in accordance with a first embodiment of the invention.

That is, a microreactor 10 shown in FIG. 1 comprises a substrate 11, a reaction chamber 12 and a production chamber 13, which act as a combined material processing chamber, as well as a channel 14, an opening 15, Peltier elements 16 as temperature adjusting devices, a cover 17, and thermistors (or thermal resistors) 18.

The substrate 11 is formed in a rectangular shape and is composed of quartz glass, silicone, ceramics, metals, plastics and other composite materials, for example. Herein, etching is performed on the substrate 11 so as to form the reaction chamber 12, production chamber 13, and channel 14.

The reaction chamber 12 stores a prescribed material injected therein and is designed to have a hollow (or a recess), which is formed in a rectangular shape in plan view and in which the prescribed material is subjected to reaction. In addition, the production chamber 13 is correspondingly designed to have a hollow (or a recess), which is formed in a rectangular shape in plan view so as to store a substance produced through reaction on the prescribed material in the reaction chamber 12.

In order to allow transmission of the substance, which is produced in the reaction chamber 12 performing reaction on the prescribed material, from the reaction chamber 12 to the production chamber 13, the reaction chamber 12 is connected with the production chamber 13 via the channel 14. In addition, the channel 14 is connected with the opening 15, branched from a branching point 14a of the channel 14, in order to exhaust unwanted gas, which is contained in the substance transmitted between the reaction chamber 12 and the production chamber 13, to the exterior.

A plurality of Peltier elements 16 are arranged beneath the reaction chamber 12 and the channel 14, which are thus cooled down. Specifically, a Peltier element 16a is arranged beneath the reaction chamber 12; a Peltier element 16b is arranged beneath the channel 14 in proximity to the reaction chamber 12; a Peltier element 16c is arranged beneath the channel 14 at an intermediate position between the reaction chamber 12 and the production chamber 13; and a Peltier element 16d is arranged beneath the channel 14 in proximity to the production chamber 13.

The Peltier element is the component that is designed for the purpose of temperature control, wherein it is constituted by sandwiching an n-type semiconductor chip and a p-type semiconductor chip between two insulating substrates on which electrodes are formed for establishing connections and wherein they are joined together to act as a π-type component as a whole and are electrically connected together. When applying electricity to the Peltier element, one end of the semiconductor chip decreases in temperature while the other end of the semiconductor chip increases in temperature due to the so-called Peltier effect, whereby one insulating substrate is cooled down while the other insulating substrate is subjected to heat dissipation. Herein, the temperature of the Peltier element can be adjusted in response to the magnitude of electric current or the duty ratio of pulse. Therefore, it is possible to easily change the function of the Peltier element from heating to cooling by inverting the electrification direction. The thermistor 18 can be arranged in a temperature-controlled object or in proximity to the temperature-controlled object, whereby it is possible to adjust the magnitude of electric current in response to the temperature difference detected from the preset temperature. By arranging circuitry with respect to each Peltier element, it is possible to realize the temperature setting independently with respect to each of the Peltier elements.

In the above, the Peltier elements 16 are arranged in the prescribed side contacting the substrate 11 above or under the channel 14 and reaction chamber 12; alternatively, they are arranged in the hollows in connection with the substrate 11.

The cover 17 is arranged to protect the reaction chamber 12, production chamber 13, and channel 14 on the substrate 11, wherein it is formed in a 'transparent' planar shape composed of quartz glass. If the material for use in the cover 17 is limited by the testing material, it is possible to form the cover 17 by use of the same material of the substrate 11.

The thermistors 18 are independently arranged above the Peltier elements 16 and above the cover 17 in order to measure temperature. These thermistors 18 are designed to detect independent temperatures.

Incidentally, a material injection hole (not shown) penetrating through the cover 17 is formed to penetrate through the cover 17 in order to introduce the material into the reaction chamber 12.

A substance can be produced using the microreactor 10 in response to solubility difference. For example, transesterification (or ester interchange reaction) can be performed by use of the microreactor 10 composed of quartz glass, as follows:

That is, methyl propionate ($CH_3CH_2COOCH_3$) and ethanol ($CH_3CH_2OH$) are introduced into the reaction chamber 12, into which p-toluenthrouphone acid is introduced as a catalyzer. Then, the Peltier elements 16a, 16b, and 16c are respectively electrified while they are measured in temperature by use of the thermistors 18, so that they are increased in temperature up to 70° C.; and the Peltier element 16d is electrified and is increased in temperature to 20° C., thus causing reaction of methyl propionate ($CH_3CH_2COOCH_3$) and ethanol ($CH_3CH_2OH$).

Thus, methanol ($CH_3OH$) is produced in the production chamber 13, and the ethyl propionate ($CH_3CH_2COOCH_2CH_3$) is produced in the reaction chamber 12.

In addition, a substance can be produced using the microreactor 10 in response to the boiling point difference. For example, alcohol separation is actualized using the microreactor 10 composed of silicone as follows:

That is, the mixture composed of ethanol ($CH_3CH_2OH$) and methoxyethanol ($CH_3OCH_2CH_2OH$) is introduced into the reaction chamber 12. Then, the Peltier elements 16a and 16b are electrified while temperatures thereof are measured by the thermistors 18, wherein they are increased in temperature and are set to 100° C. and 80° C. respectively, while the other Peltier elements 16c and 16d are set to 10° C. After that ethanol ($CH_3CH_2OH$) is produced in the production chamber 13, the methoxyethanol ($CH_3OCH_2CH_2OH$) is produced in the reaction chamber 12.

In the above, a plurality of Peltier elements 16a to 16d are arranged at prescribed positions with prescribed distances therebetween on the channel 14 and are individually set to respective temperatures. Specifically, during the transesterification, when methanol ($CH_3OH$) produced from methyl propionate ($CH_3CH_2COOCH_3$) and ethanol ($CH_3CH_2OH$), which is initially introduced into the reaction chamber 12, are forced to pass through the channel 14 towards the production chamber 13, each of the Peltier elements 16a to 16c is set to 70° C., and the Peltier element 16d is set to 20° C., whereby methanol is gradually cooled and moved to the production chamber 13. That is, by individually setting prescribed temperatures for the Peltier elements 16a to 16d, it is possible to easily actualize temperature controls on methyl propionate ($CH_3CH_2COOCH_3$) and ethanol ($CH_3CH_2OH$).

Due to the provision of the Peltier elements 16, it is possible to effectively use the microreactor 10 as a small-size temperature control device, in particular, a cooling device.

Due to the individual settings for temperatures with respect to the Peltier elements 16a to 16d, when materials introduced into the reaction chamber 12 are moved towards the production chamber 13, they are subjected to prescribed temperature controls with ease. Therefore, it is possible to easily produce a desired substance through reaction using a plurality of materials in response to temperature differences.

Figure 2A:
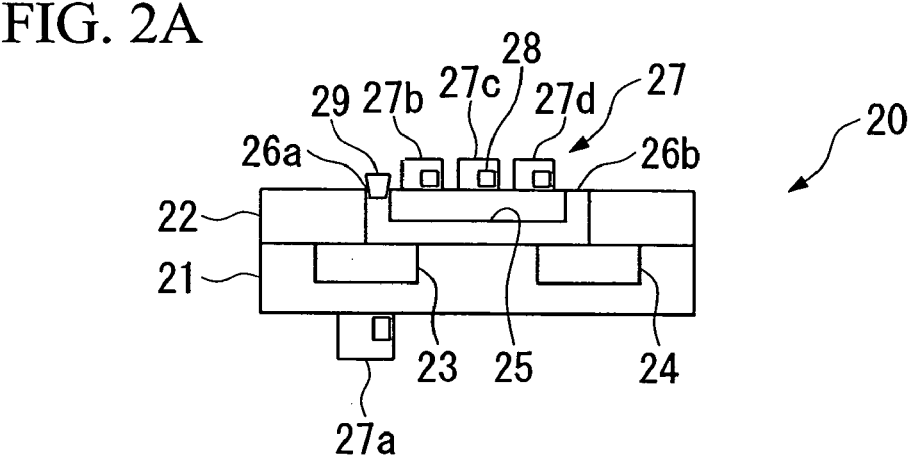
FIG. 2A is a cross-sectional view showing a microreactor constituted by an upper substrate and a lower substrate in accordance with a second embodiment of the invention.
Figure 2B:
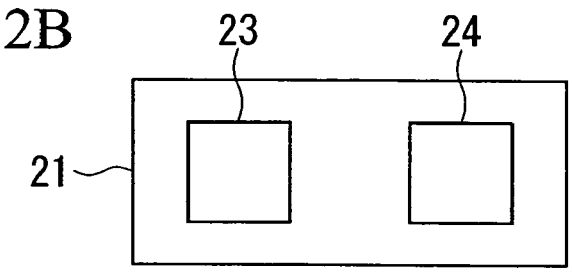
FIG. 2B is a plan view showing the appearance of the lower substrate shown in FIG. 2A.
Figure 2C:
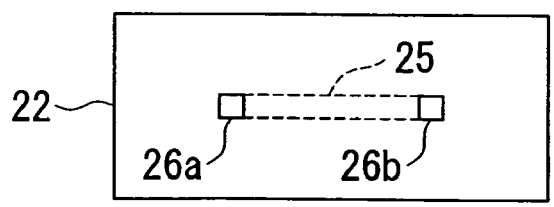
FIG. 2C is a plan view showing the appearance of the upper substrate shown in FIG. 2A.

FIGS. 2A to 2C show a microreactor 20 in accordance with a second embodiment of the invention.

That is, the microreactor 20 comprises a lower substrate 21, an upper substrate 22, a reaction chamber 23 and a production chamber 24, which act as a combined material processing chamber, a channel 25, openings 26a and 26b, Peltier elements 27, and thermistors 28.

The lower substrate 21 is formed in a rectangular shape in plan view and is composed of quartz glass, silicon, ceramics, metals, plastics, or other composite materials, for example. The reaction chamber 23 and the production chamber 24 are formed inside of the lower substrate 21, wherein they are processed as hollows (or recesses) each having a rectangular shape in plan view.

The upper substrate 22 is formed in a rectangular shape in plan view and is composed of quartz glass, silicon, ceramics, metals, plastics, and other composite materials, for example. The channel 25 is formed inside of the upper substrate 22, wherein it is processed as a horizontally-lying U shape.

The lower substrate 21 and the upper substrate 22 tightly join together via silicon coating or bolts (not shown) therebetween.

The reaction chamber 23 stores materials introduced therein, wherein it is formed in a rectangular shape so as to cause reaction on the materials. In addition, the production chamber 24 is correspondingly formed in a rectangular shape in order to store a substance that is produced through reaction of the materials in the reaction chamber 23.

The channel 25 connects together the reaction chamber 23 and the production chamber 24 in order to allow transmission of the substance, which is produced through reaction on materials in the reaction chamber 23, towards the production chamber 24. In addition, openings 26a and 26b are formed and connected with the channel 25 in order to allow further introduction of materials and to exhaust unwanted gas contained in the substance, which is transmitted from the reaction chamber 23 to the production chamber 24, for example.

A plurality of Peltier elements 27 are arranged at prescribed positions beneath the reaction chamber 23 and above the channel 25 in order to cool the reaction chamber 23 and the channel 25 respectively. Specifically, a Peltier element 27a is arranged beneath the reaction chamber 23; a Peltier element 27b is arranged above the channel 25 in proximity to the reaction chamber 23; a Peltier element 27c is arranged at an intermediate position between the reaction chamber 23 and the production chamber 24 above the channel 25; and a Peltier element 27d is arranged above the channel 25 in proximity to the production chamber 24. These Peltier elements 27 are accompanied with thermistors 28 that measure temperatures at prescribed positions in proximity to the substrates 21 and 22. In response to measurement results, a control device (not shown) determines amounts of electrification individually applied to the Peltier elements 27, which can be thus individually set up at prescribed temperatures on the channel 25. Incidentally, the thermistors 28 can be arranged above the Peltier elements 27, or they can be arranged at prescribed positions in the substrate 21 and 22 oppositely to the Peltier elements 27.

As described above, a prescribed substance can be produced using the microreactor 20 in response to the solubility difference of materials. For example, a sol-gel solution can be produced using the microreactor 20 made of quartz glass, as follows:

A nitrogen gas is introduced into the opening 26a and is then exhausted from the opening 26b, so that the microreactor 20 as a whole is placed under the nitrogen atmosphere; then, ethoxy-lithium ($LiOC_2H_5$), pentaethoxy-niobium ($Nb(OC_2H_5)_5$), and methoxy-ethanol ($CH_3OCH_2CH_2OH$) are introduced into the reaction chamber 23 via the opening 26a, and a plug 29 is attached to the opening 26a.

Thereafter, the Peltier elements 27a, 27b, 27c, and 27d are respectively set to prescribed temperatures, i.e., 110° C., 90° C., 80° C., and 10° C., which are maintained for a while so as to cause reaction using ethoxy-lithium ($LiOC_2H_5$), pentaethoxy-niobium ($Nb(OC_2H_5)_5$), and methoxy-ethanol ($CH_3OCH_2CH_2OH$).

As a result, ethanol ($CH_3CH_2OH$) is produced in the production chamber 24; then, the Peliter elements 27a, 27b, 27c, and 27d are respectively set to prescribed temperatures, i.e., 125° C., 10° C., 10° C., and 10° C., which are maintained so that the microreactor 20 is placed in a standby state for twelve hours. Then, a sol-gel solution of lithium niobate is produced in the reaction chamber 23.

In addition, it is possible to perform ethanol drying using metallic sodium in the microreactor 20 made of quartz glass, as follows:

A nitrogen gas is introduced into the opening 26a and is then exhausted from the opening 26b, so that the microreactor 20 is placed in the nitrogen atmosphere. The, ethanol ($CH_3CH_2OH$) is introduced into the reaction chamber 23 via the opening 26a, wherein all of the Peltier elements 27a to 27d are set to 20° C., which is maintained for a while. In addition, small elements of metallic sodium are put into the reaction chamber 23; then, the plug 29 is attached to the opening 26a. At this time, the temperatures of the Peltier elements 27a to 27d are monitored by use of the thermistors 28, wherein so-called programmed temperature adjustment is performed in order to avoid rapid temperature increase. As a result, anhydrous ethanol is produced in the reaction chamber 23.

Furthermore, when a substance is produced in the microreactor 20 in response to state change thereof, it is possible to selectively produce an erythro form or a threo form in the microreactor 20 made of quartz glass, as follows:

A nitrogen gas is introduced into the opening 26a and is then exhausted from the opening 26b, so that the microreactor 20 is placed in the nitrogen atmosphere. Then, benzyl acetic acid, dried organic solvent, and isopropyl magnesium bromide are introduced into the reaction chamber 23 via the opening 26a, wherein all of the Peltier elements 27a to 27d are set to 20° C., which is maintained for several hours.

In order to produce the erythro form, all of the Peltier elements 27a to 27d are set to −78° C., wherein phenyl-aldehyde and hydrochloric acid are introduced into the reaction chamber 23, from which liquid is taken out, subjected to extraction using organic solvent, and then subjected to aftertreatment using sodium carbonate, thus being concentrated.

Then, column separation is performed to produce β-hydroxy-thioamide, wherein a ratio between erythro and threo is 7:1, and yield is 80%.

On the other hand, in order to selectively produce threo form, all of the Peltier elements 27a to 27d are set to 0° C., wherein phenyl-aldehyde is introduced into the reaction chamber 23 via the opening 26a. Then, the Peltier elements 27a to 27d are set to 50° C. and are maintained for twenty hours. Thereafter, hydrochloric acid is introduced into the reaction chamber 23 via the opening 26a, from which liquid is taken out, subjected to extraction using organic solvent, and subjected to aftertreatment using sodium carbonate, thus being concentrated.

Thereafter, column separation is performed to produce β-hydroxy-thioamide, wherein a ratio between erythro and threo is 1:9, and yield is 70%.

In the above, a plurality of Peltier elements 27a to 27d, each of which can be independently set up at a prescribed temperature, are arranged at prescribed positions in proximity to the reaction chamber 23 and the channel 25 respectively, wherein they are securely held with prescribed distances therebetween. Thus, the second embodiment can demonstrate the same effect of the first embodiment.

It is possible to modify the first embodiment such that the Peltier element 16a, originally arranged beneath the substrate 11 can be rearranged and embedded in the upper portion or lower portion of the reaction chamber 12. In this case, the Peltier element 16a is embedded in the hollow formed in the upper portion or lower portion of the reaction chamber 12, whereby it is possible to actualize flattening with respect to the Peltier element 16a, which thus does not project from the microreactor 10; thus, it is possible to realize structural rationalization. The same modification can be applied to the second embodiment with respect to the reaction chamber 23.

In addition, it is possible to modify the first embodiment such that the Pelier elements 16b to 16d originally arranged beneath the channel 14 can be rearranged and embedded in the upper portion or lower portion of the channel 14. In this case, the Peltier elements 16b to 16d are embedded in the hollows formed in the upper portion or lower portion of the channel 14, whereby it is possible to actualize flattening with respect to the Peltier elements 16b to 16d, which thus do not project from the microreactor 10; thus, it is possible to realize structural rationalization. The same modification can be applied to the second embodiment with respect to the channel 25.

It is possible to provide another embodiment in which a microreactor is arranged in the substrate of a Peltier element so as to cause reaction of materials.

Figure 3:
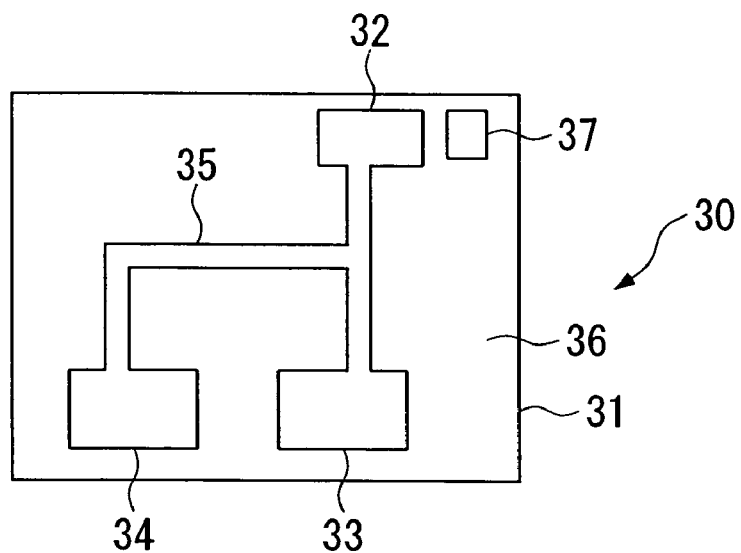
FIG. 3 is a plan view showing a microreactor in accordance with a third embodiment of the invention.

That is, FIG. 3 shows a microreactor 30 according to a third embodiment, which comprises a substrate 31 arranged on the upper surface of a Peltier element acting as a temperature adjusting device, reaction chambers 32 and 33 and a production chamber 34, which work as a combined material processing chamber, a channel 35, a cover 36, and a thermistor 37.

The substrate 31 is formed in a rectangular shape composed of silicon. The substrate 31 is processed by etching, so that the reaction chambers 32 and 33 and the production chamber 34 are formed thereon.

Each of the reaction chambers 32 and 33 is formed in a rectangular shape so as to hold materials introduced therein and cause reaction of materials. The production chamber 34 is correspondingly formed in a rectangular shape so as to hold a substance, which is produced through reaction of materials in the reaction chambers 32 and 33.

The channel 35 connects together the reaction chambers 32 and 33 and the production chamber 34 in order to allow transmission of the substance, which is produced through reaction of materials in the reaction chambers 32 and 33, towards the production chamber 34.

The cover 36 is arranged on the substrate 31 so as to protect the reaction chambers 32 and 33, the production chamber 34, and the channel 35. The cover 36 is formed as a transparent planar board composed of quartz glass, for example.

The thermistor 37 for measuring temperature is attached to the upper portion of the cover 36. Herein, a material injection hole (not shown) is formed to penetrate through the cover 36 in order to inject materials into the reaction chambers 32 and 33.

In the above, the substrate 31 has a square shape of prescribed dimensions, i.e., 20 mm length and 20 mm width, and is arranged on the Peltier element (not shown) having a square shape of prescribed dimensions, i.e., 30 mm length and 30 mm width. In addition, the channel 35 is 500 µm in width and 20 µm in depth.

It is possible to actualize organic synthesis of protein by use of the microreactor 30 composed of plastics such as polypropylene, as follows:

That is, solutions A, B which can produce protein, is introduced into the reaction chamber 32 that is set to 37° C., wherein microsylinges are used to inject the material at the flow velocity of 0.05 µL/min for 100 minutes at equal mixing. Thus, it is possible to produce polyphenyl-alanine in the production chamber 34.

Figure 4A:
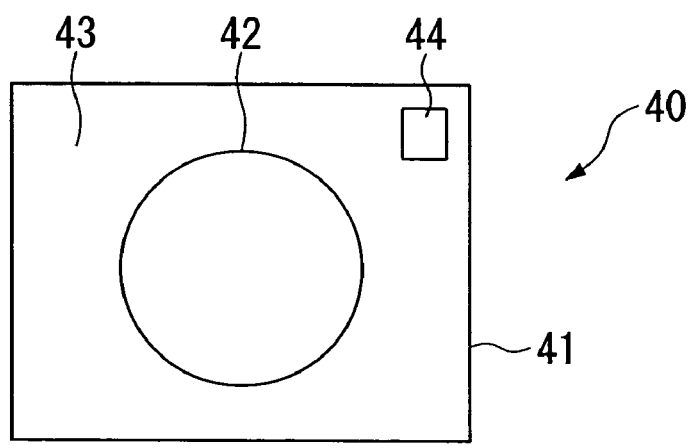
FIG. 4A is a plan view showing a microreactor in accordance with a fourth embodiment of the invention.
Figure 4B:
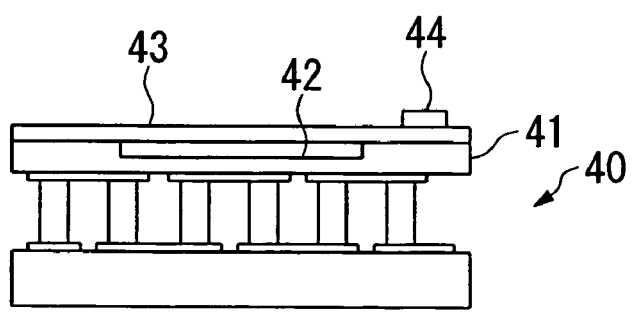
FIG. 4B is a cross-sectional view showing the microreactor shown in FIG. 4A.

FIGS. 4A and 4B show a microreactor in accordance with a fourth embodiment of the invention.

That is, a microreactor 40 comprises a substrate 41 for a Peltier element serving as a temperature adjusting device, a reaction chamber 42 serving as a material processing chamber, a cover 43, and a thermistor 44.

The substrate 41 is arranged in the cooling side of the Peltier element, wherein it is subjected to cutting process such as etching or press working so as to form the reaction chamber 42 having a circular shape thereon. The reaction chamber 42 is not necessarily formed by processing the substrate 41. Alternatively, it is possible to attach a plastic substrate, in which the reaction chamber 42 is formed in advance, onto the substrate 41.

The cover 43 is arranged on the substrate 41 in order to protect the reaction chamber 42.

The cover 43 is made by a transparent planar board composed of quartz glass, for example.

The thermistor 44 for measuring temperature is attached to the upper portion of the cover 43. In addition, a material injection hole (not shown) is arranged to penetrate through the cover 43 in order to inject materials into the reaction chamber 42.

It is possible to actualize recrystallization of copper sulfate by use of the microreactor 40, which is formed by alumina together with substrate 41, as follows:

A nitrogen gas is introduced into the reaction chamber 42, which is thus placed in the nitrogen atmosphere and into which saturated solution of copper sulfate is injected. Then, the thermistor 44 is activated to monitor the temperature of the microreactor 40, wherein the reaction chamber 42 is increased in temperature up to 95° C., then, it is decreased in temperature to 6° C. Thus, it is possible to produce a prescribed substance, which is filtered to obtain copper sulfate crystals.

Figure 5:
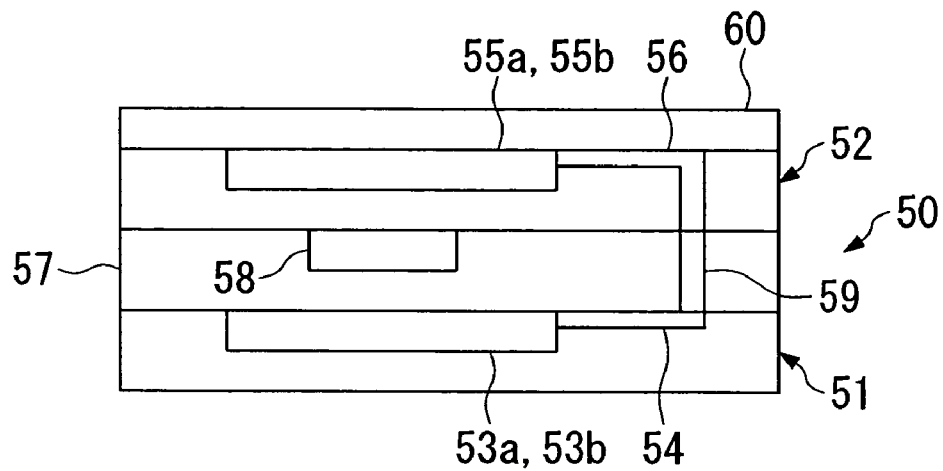
FIG. 5 is a cross-sectional view showing a microreactor unit in which two microreactors are combined together in accordance with a fifth embodiment of the invention.

FIG. 5 shows a microreactor unit in accordance with a fifth embodiment of the invention in which a plurality of microreactors (e.g., two microreactors) are combined together, wherein the upper layer and lower layer are connected via channels.

That is, a microreactor unit 50 comprises two microreactors, which are arranged at an upper side and a lower side respectively and are combined together. The microreactor 51 comprises a reaction chamber 53a, a production chamber 53b, and a channel 54, and the microreator 52 comprises a reaction chamber 55a, a production chamber 55b, and a channel 56.

A planar portion is arranged between the microreactors 51 and 52, wherein a Peltier element 58 is embedded therein.

A channel 59 is formed to penetrate through the planar portion 57 so as to connect the channels 54 and 56 together.

A cover 60 is arranged on the upper portion of the microreactor 52 so as to protect the reaction chamber 55a, production chamber 55b, and channel 56.

It is possible to cause reaction for creating a substance by use of the microreactor unit 50 in which the microreactor 51 is increased in temperature while the microreactor 52 is decreased in temperature, as follows:

Due to the layered structure of the microreactor unit 50 comprising the microreactors 51 and 52, it is possible to concentrate spaces securing the reaction chambers 53a and 55a and the production chambers 53b and 55b, whereby it is necessary to provide a single Peltier element 58 with respect to all of the reaction chambers 53a and 55a and the production chambers 53b and 55b. Thus, it is possible to realize the structural rationalization.

In the aforementioned embodiments, the reaction chambers and production chambers can be formed by fine processing such as etching and milling in microreactors. Alternatively, metals are adequately shaped by precision casting, metal injection, and the like; then, they are subjected to surface processing. Furthermore, the microreactors can be formed by light modeling or injection formation using plastics.

In addition, it is possible to form the hollows having different depths with respect to the reaction chamber and production chamber respectively.

The overall shape of the hollow is not necessarily limited to the rectangular shape in plan view; therefore, it is possible to employ a circular shape for the hollow.

Furthermore, it is possible to adequately and arbitrarily select various cross-sectional shapes for the hollows in terms of their depths and slopes in consideration of types of materials. Moreover, the channels can be shaped to have slopes therein as necessary.

In the foregoing embodiments, it is possible to modify the microreactor such that a plurality of partitioning substrates are interconnected together to form the complete substrate for arranging chambers and channels. Of course, it is unnecessary to split the substrate into a plurality of partitioning substrates; hence, the substrate of the microreactor can be interconnected with the other substrate.

Figure 6:
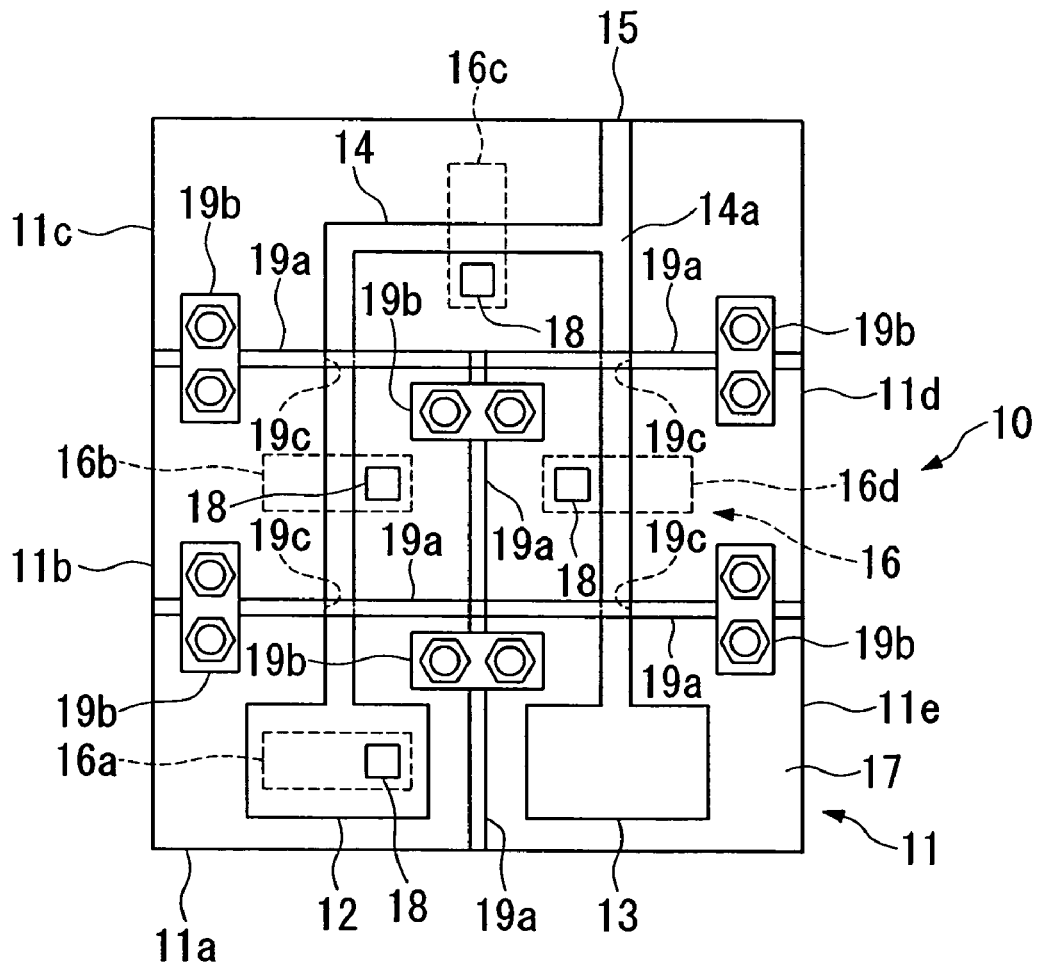
FIG. 6 is a plan view showing a microreactor in accordance with a sixth embodiment of the invention.

The foregoing microreactor 10 using the substrate 11 shown in FIG. 1 can be modified to provide five partitioning substrates 11a to 11e in accordance with a sixth embodiment of the invention as shown in FIG. 6. Specifically, the first partitioning substrate 11a provides the reaction chamber 12 and a Peltier element 16a arranged in the lower portion of the reaction chamber 12; the second partitioning substrate 11b provides the channel 14 and a Peltier element 16b arranged in the lower portion of the channel 14; the third partitioning substrate 11c provides the channel 14, the branching point 14a, the opening 15, and a Peltier element 16c arranged in the lower portion of the channel 14; the fourth partitioning substrate 11d provides the channel 14 and a Peltier element 16d arranged in the lower portion of the channel 14; and the fifth partitioning substrate 11e provides the production chamber 13. These partitioning substrates 11a to 11e are interconnected together on an interconnection sheet 19a by means of interconnection members 19b. The interconnection sheet 19a is formed by a silicon sheet, for example, the thickness of which ranges from 0.01 mm to 5 mm, preferably, from 0.01 mm to 1 mm. In addition, opening 19c are formed at prescribed positions not to interrupt communications using the channel 14 among the partitioning substrates 11a to 11e, which are interconnected together.

Figure 7:
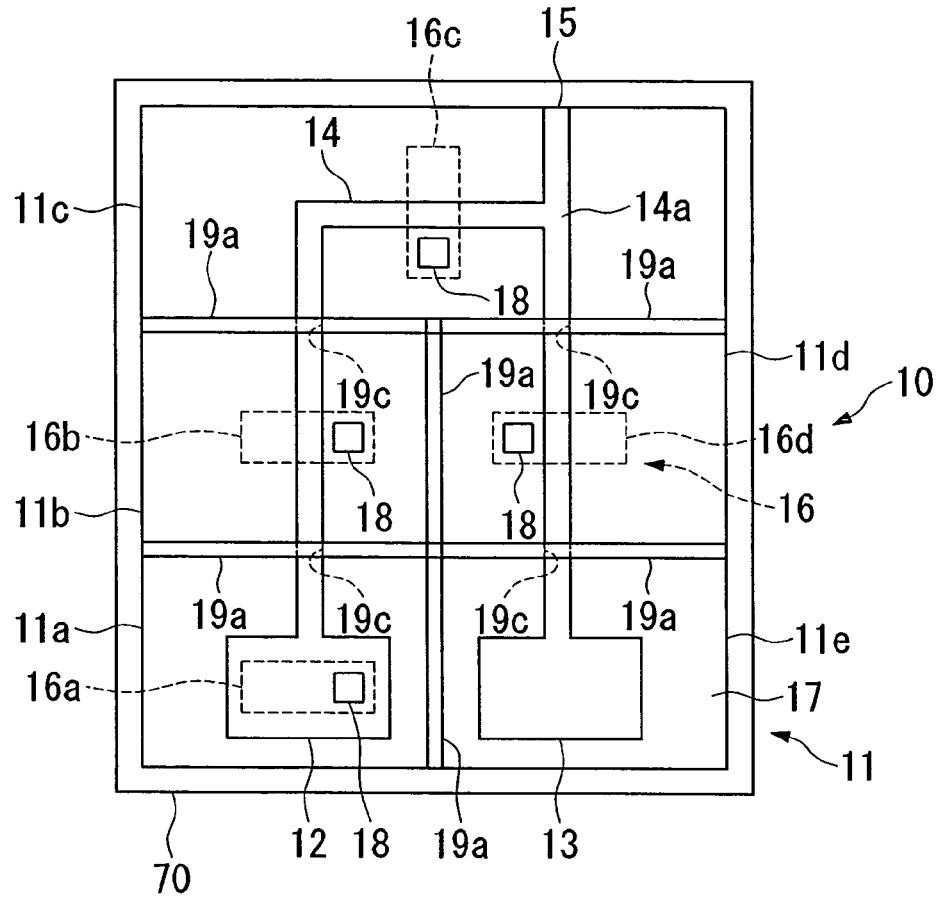
FIG. 7 is a plan view showing a microreactor in accordance with a seventh embodiment of the invention.

The aforementioned microreactor 10 according to the sixth embodiment can be further modified in accordance with a seventh embodiment as shown in FIG. 7, wherein the partitioning substrates 11a to 11e are interconnected together by being inserted into a housing plate 70, in which they are engaged together. Thus, it is possible to improve the precision for establishing interconnections among the partitioning substrates 11a to 11e.

Figure 8:
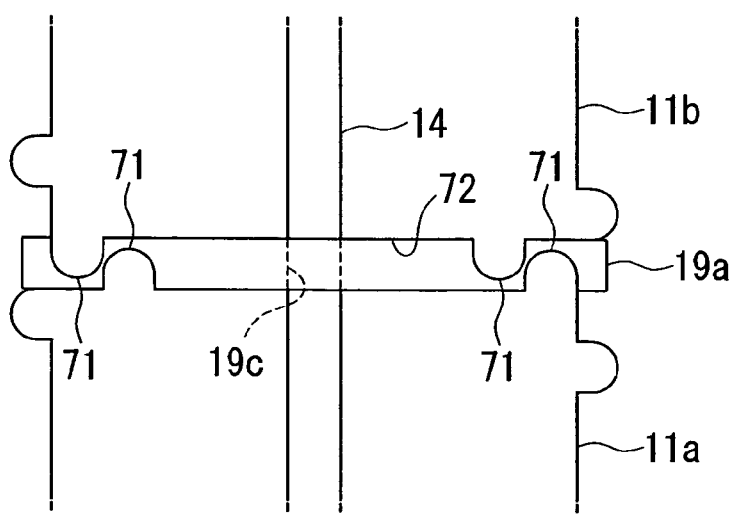
FIG. 8 is a fragmentary enlarged view showing a part of the microreactor of FIG. 7, which is modified.

The microreactor shown in FIG. 7 can be modified as shown in FIG. 8 in which each of the partitioning substrates 11a to 11e have projections 71 at ends thereof, whereby gaps 72 are formed between the partitioning substrates 11a to 11e that are interconnected together. Due to the provision of the projections 71 and the gaps 72, it becomes easy for the human operator to attach the interconnection sheet 19a for intervening the partitioning substrates 11a to 11e. It is preferable that the gaps 72 be reduced in thickness compared with the thickness of the interconnection sheet 19a.

By assembling a plurality of partitioning substrates together to form the complete substrate for the microreactor as described above, it becomes possible for the human operator to freely change the overall layout of the reaction chamber, production chamber, channel, openings, and Peltier elements arranged on the substrate.

Figure 9:
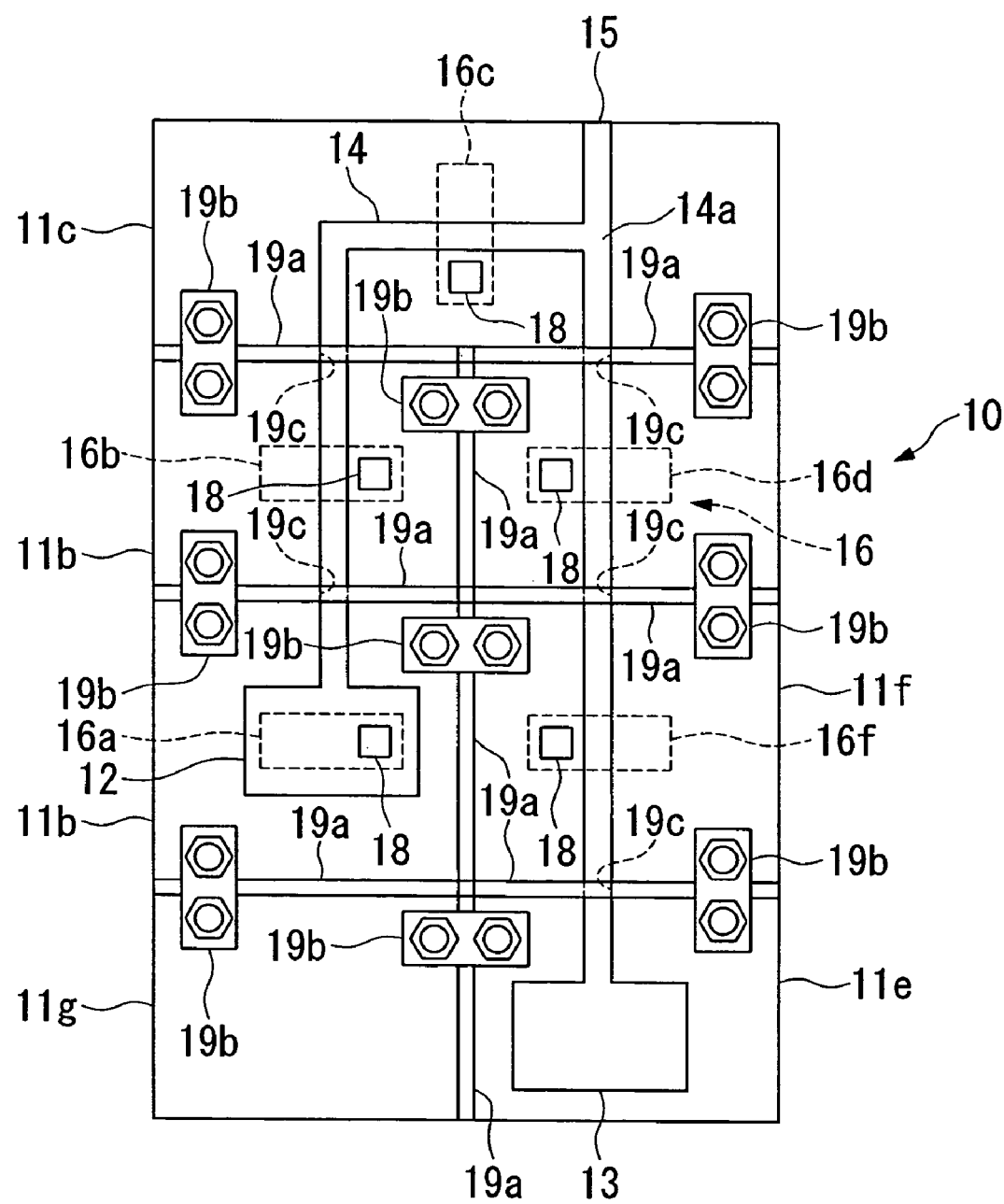
FIG. 9 is a plan view showing a microreactor in accordance with an eighth embodiment of the invention.

Furthermore, it is possible to further modify the microreactor 10 in accordance with an eighth embodiment of the invention as shown in FIG. 9, wherein there are further provided a partitioning substrate 11f having a Peltier element 16f and a thermistor 18 in order to extend a part of the channel 14, and a partitioning substrate 11g for adjustment in layout for interconnecting the partitioning substrate 11a to 11f together. This makes it possible to freely arrange the layout for the constituent parts on the substrate; hence, it is possible for the human operator to easily set up the desired layout for the chambers and channel.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A microreactor comprising:
   a reaction chamber into which at least one material is introduced;
   a production chamber;
   a channel for connecting together the reaction chamber and the production chamber; and
   a plurality of temperature adjusting devices, each of which is independently controlled in temperature, are arranged at prescribed positions with prescribed distances therebetween on a substrate in proximity to the reaction chamber, the production chamber, or the channel.

2. A microreactor according to claim 1, wherein each of the plurality of temperature adjusting device is constituted by a Peltier element.

3. A microreactor according to claim 1, wherein the substrate is formed by assembling a plurality of partitioning substrates having the reaction chamber, the production chamber, and the channel.

4. A microreactor according to claim 3, wherein each of the plurality of temperature adjusting device is constituted by a Peltier element.

5. A microreactor according to claim 2, wherein the Peltier element is embedded in a hollow, which is formed in proximity to the reaction chamber, the production chamber, and/or the channel in its upper portion or lower portion.

6. A microreactor according to claim 4, wherein the Peltier element is embedded in a hollow, which is formed in proximity to the reaction chamber, the production chamber, and/or the channel in its upper portion or lower portion.

7. An assembling method for a microreactor having a substrate on which a reaction chamber, into which prescribed materials are introduced, a production chamber, and a channel for interconnecting together the reaction chamber and the production chamber are formed, wherein a plurality of temperature adjusting devices, each of which is independently adjusted in temperature, are arranged at prescribed positions with prescribed distances therebetween in proximity to the reaction chamber, the production chamber, or the channel, said assembling method comprising the step of:
   assembling a plurality of partitioning substrates having the reaction chamber, the production chamber, and the channel, thus forming the substrate for the microreactor.

8. A substance production method using a microreactor that comprises a reaction chamber, into which at least one material is introduced, a production chamber, a channel, and a plurality of temperature adjusting devices, each of which is independently controlled in temperature and which are arranged at prescribed positions with prescribed distances therebetween on a substrate in proximity to the reaction chamber, the production chamber, or the channel, said substance production method comprising the steps of:

causing reaction of the material in the reaction chamber, which is independently controlled in temperature by use of the temperature adjusting device, thus producing a substance; and transmitting the substance from the reaction chamber to the production chamber via the channel while being controlled in temperature by use of the temperature adjusting device, which is arranged to control the channel at a prescribed temperature.

9. The substance production method using a microreactor according to claim 8, wherein a plurality of materials having different boiling points are introduced into the reaction chamber and are subjected to reaction in response to differences of the boiling points thereof.

10. The substance production method using a microreactor according to claim 8, wherein a plurality of materials having different state changes are introduced into the reaction chamber and are subjected to reaction in response to differences of the state changes thereof.

11. The substance production method using a microreactor according to claim 8, wherein a plurality of materials each having different solubility are introduced into the reaction chamber and are subjected to reaction in response to differences of the solubility thereof.

* * * * *